(12) United States Patent
Fagan

(10) Patent No.: US 8,433,435 B2
(45) Date of Patent: Apr. 30, 2013

(54) METHOD AND SYSTEM FOR ELIMINATING EXTERNAL PIERCING IN NC CUTTING OF NESTED PARTS

(76) Inventor: Matthew Fagan, Middle Park (AU)

(*) Notice: Subject to any disclaimer, the term of this patent is extended or adjusted under 35 U.S.C. 154(b) by 755 days.

(21) Appl. No.: 12/345,184

(22) Filed: Dec. 29, 2008

(65) Prior Publication Data
US 2009/0108792 A1 Apr. 30, 2009

Related U.S. Application Data

(62) Division of application No. 10/892,634, filed on Jul. 16, 2004, now Pat. No. 7,469,620.

(60) Provisional application No. 60/543,744, filed on Feb. 10, 2004.

(51) Int. Cl.
*G06F 19/00* (2011.01)
*B26D 1/00* (2006.01)
*B26D 3/00* (2006.01)
*B23K 26/00* (2006.01)

(52) U.S. Cl.
USPC ........... 700/134; 700/159; 700/166; 700/184; 83/13; 83/34; 83/39; 83/46; 83/48; 219/121.69

(58) Field of Classification Search .................. 700/134, 700/159, 166, 184; 83/13, 27, 34, 39, 40, 83/46, 48, 50; 219/121.67
See application file for complete search history.

(56) References Cited

U.S. PATENT DOCUMENTS

| | | | | |
|---|---|---|---|---|
| 3,875,389 A | * | 4/1975 | McFadden et al. | 700/171 |
| 4,210,041 A | * | 7/1980 | Mitman et al. | 83/32 |
| 5,856,649 A | * | 1/1999 | Yamazaki et al. | 219/121.67 |
| 5,910,260 A | * | 6/1999 | Gerber | 219/121.67 |
| 6,128,546 A | | 10/2000 | Basista et al. | |
| 6,205,370 B1 | * | 3/2001 | Blaimschein et al. | 700/134 |
| 6,359,251 B1 | | 3/2002 | Picard et al. | |
| 6,609,044 B1 | * | 8/2003 | Basista et al. | 700/166 |
| 6,810,779 B2 | * | 11/2004 | Feldman et al. | 83/32 |
| 7,154,530 B2 | * | 12/2006 | Andrews et al. | 348/86 |
| 2003/0192865 A1 | * | 10/2003 | Cole et al. | 219/121.67 |

FOREIGN PATENT DOCUMENTS

EP 1342526 9/2003

OTHER PUBLICATIONS

European Application No. 08105174.0, Communication Pursuant to Article 94(3) EPC dated Jun. 1, 2010, 1 page.
European Application No. 08105174.0, Response to Communication Pursuant to Article 94(3) EPC, Dec. 7, 2010, 28 pages.

(Continued)

*Primary Examiner* — Jeffrey A Gaffin
*Assistant Examiner* — Darrin Dunn
(74) *Attorney, Agent, or Firm* — Lathrop & Gage LLP

(57) ABSTRACT

This invention pertains to machinery and methods for cutting a workpiece utilizing a cutting tool into at least two parts having prescribed shapes from a metal plate comprising the steps of: identifying each of the parts by one or more contour lines; cutting a workpiece along one of the identifying contour lines into one of the parts; creating at least one path diversion, wherein the diversion has an associated bounded region or opportunity; cutting the workpiece along a contour line associated with the opportunity; resuming the cutting of the part along the identifying contour line with minimal damage to the part being cut; finishing the cutting of the part and then moving the cutting tool to the opportunity and then to an associated adjacent identifying contour line and then repeating the process until all parts have been manufactured.

17 Claims, 12 Drawing Sheets

OTHER PUBLICATIONS

European Search Report dated Apr. 28, 2005 issued in related European Patent Application Serial No. 04026900, 3 pages.
European Examination Report dated Sep. 29, 2006 issued in related European Patent Application Serial No. 04026900, 5 pages.
Reply to European Examination Report dated Sep. 29, 2006 issued in related European Patent Application Serial No. 04026900 filed Feb. 14, 2007, 16 pages.
Consultation by Telephone dated Oct. 4, 2007 issued in related European Patent Application Serial No. 04026900, 2 pages.
Communication Under Rule 71(3) EPC of Notice to Grant related European Patent Application 04026900 dated Apr. 16, 2008, 5 pages.
Selected File History from related U.S. Appl. No. 10/892,634, from Dec. 8, 2006 to Sep. 25, 2008, 103 pages.

* cited by examiner

METHOD AND SYSTEM FOR ELIMINATING EXTERNAL PIERCING IN NC CUTTING OF NESTED PARTS

RELATED APPLICATIONS

This application is a divisional of U.S. patent application Ser. No. 10/892,634, filed Jul. 16, 2004 now U.S. Pat. No. 7,469,620 which claims the benefit of U.S. Provisional Patent Application Ser. No. 60/543,744, filed Feb. 10, 2004, the disclosures of which are incorporated by reference herein.

FIELD OF THE INVENTION

This application relates to the field of part cutting from sheets or plates and more specifically to methods for improving part cutting by creating positioning or cutting opportunities for cutting between adjacent parts and efficiently disposing of remnants thereof.

BACKGROUND OF THE INVENTION

Conventional metal cutting technologies are well known in the art. For example, Oxy-Acetylene cutting technology has been used since the early 20th century wherein an oxygen and acetylene gas mixture is directed in a stream to burn through steel plate. Directed through torches at high pressure, the hot narrow gas stream actually combusts the material as iron burns easily at the high temperature used and the fuel gas supplied. This has been the traditional and fast way to cut iron and steel for over a hundred years. Oxy-Acetylene cutting technology can cut steel up to one foot thick into desired and specific shapes. Plasma cutting technology is a relatively new, circa 1970, cutting technology for cutting steel, mantels steel and aluminum where a stream of hot ionized gas is used to support an electric arc that burns and melts the material. This technology is up to ten times faster than an oxy-acetylene torch, however it is limited to metals under six inches in thickness and generally under two inches.

High Definition Plasma cutting technology is an improvement to plasma cutting technology with torches developed to cut sheet materials up to perhaps a half inch. This technology produces more accurate, narrow cuts in such thinner material. LASER cutting technology is a contemporary of plasma. In LASER cutting technology a highly focused laser beam is directed to the material and burns or melts the material. In some cases the laser may have gas assistance. LASER cutting technology has advantages over the other technologies as it requires much lower power, cuts with far greater precision, has a minimal cutting width and can cut a wide range of metallic and non-metallic materials including steel, aluminum, timber, plastic, etc. Water-Jet technology is another cutting technology developed in the 1970's, which uses abrasive compounds in a very narrow high speed water jet. Water-Jet technology is used principally on stone and ceramics but can also he used for heat free cutting of thin metals.

The terms profile, path and contour are essentially equivalent terms for the collection of lines and arcs which make up the geometry of a part boundary. Usually paths are closed, whether internal or external. If they are unclosed internal paths, they are called 'slits'. Unclosed external paths are problematic as it is not clear where the part exists until a path closes. Cutting of shapes is variously known as 'profiling' or 'contouring'. Path is usually more specifically the contour followed by a cutting machine, where it is called a 'tool path' in the general NC parlance. A part consists of a single outside profile and perhaps multiple holes in the part which are described as internal profiles manufactured from a block or sheet of material referred to as a workpiece.

The term "edge start" refers to cutting that can start directly on the edge of a plate. In fact a pierce only serves to provide a hole which then allows edge cutting. This is distinct from cutting from the top, as in sawing. The idea of an edge start is to heat the edge to the required burning or melting temperature before moving into the material. This takes a delay at the edge. Some N.C. controls have this function available under standard coding but most require the machine to be instructed to stay over the edge for a specific time until the material is hot enough to cut. While edge starts are preferable, without continuous cutting, a pierce is generally needed for each part. An edge start can permit cutting of material thicknesses up to twice that possible if the material has to be pierced. The other advantage is that cutting can commence almost immediately by comparison with piercing as the whole edge of the material is able to be heated to ignition point at the same time. A corollary of this is that there is not explosion of molten material from the pierce hole and no overheating of the start area just to get through the material. In the art, an edge start is extremely advantageous but rarely used. In this invention, edge starts are automatically created for all parts in a nest.

The term kerf is representative of the radius of the hole created by a torch. This is typically half the width of a line cut with a round torch. Kerf is critical to cutting. Thus when cutting a shape, the torch center must be kept at least a 'kerf' distance from the shape profile so that the part cut is the right size. This offsetting of the desired shape to the center of the torch is known as 'kerf compensation' and is one of the more demanding fractions performed by an NC control. Also of note is that the thicker the material, the higher power that is required for cutting. As a result, the diameter of the cut increases and the larger the kerf becomes. Kerf can be very small on lasers and sheet metal, around 0.15 mm. With thick (say 2" or 50 mm plate) it can be 4 mm for a total torch cut width of 8 mm.

In each of the forgoing cutting technologies, it is common practice to cut each part separately by creating a starting hole or "pierce" adjacent to the part and then proceeding to cut or separate the part from the surrounding material. However, there is significant cost associated with creating the pierce as it requires significant amounts of energy and time to cut through the material. Furthermore, the starting hole is extremely destructive and must be started a considerable distance from the part to avoid damaging the part both in the resultant shape of the part and the metallurgy of the heat affected area surrounding the pierce.

Generally in the art of cutting material, it is common that the cutting tool is optimized for cutting from an edge of material. Rarely is the cutting tool suitable for piercing material and often a separate process is used. Traditionally you have to pierce the material to create a hole for the edge cutting tool to work. To cut multiple parts, you have to create multiple pierces. Each pierce is time consuming, wasteful of material and damaging.

Hence, there is a need for a method and system that allows parts to be cut or separated from their surrounding material without the need of creating individual starting holes or pierces for each part.

SUMMARY OF THE INVENTION

The invention herein is a numerically controlled machine and a method for cutting a workpiece utilizing a cutting tool into at least two parts having prescribed shapes from a material block. The method comprises the steps of: identifying each of the parts by one or more contour lines; cutting the workpiece along one of the identifying contour lines into one of said parts; creating at least one diversion, wherein the diversion is shaped to remove additional material and to create bounded regions, opportunity or holes for later cutting without repiercing of the material block, the consequent bounded region or hole hereinafter called an opportunity; resuming the cutting of the part along the identifying contour line until the cut out of the part is complete. Ideally the creation of an opportunity does not change the external geometry of the current part in any way which changes the shape of the part being cut or is damaging to the part. The process proceeds to move the cutting tool to the opportunity previously made and then to an adjacent associated identifying contour line; repeating the cutting process until all the parts to be cut from the sheet have been manufactured.

A machine for making an opportunity cut in a workpiece, such as a sheet of plastic or metal plate comprises a cutting tool that includes: a head unit having a cutting head, a platform or bed upon which the sheet is placed; a programmable computer or NC control device to control the position and movement of the tool relative to the platform along a programmed path; another usually separate computer to create the computer program; the program itself created and stored in a computer file; a drive assembly connected to at least one tool and the platform to move the tool relative to the platform along the programmed path, wherein, once a drive assembly moves the tool to a position to cut the part from the plate or sheet, it is also moved to create an opportunity on the programmed path.

In a further embodiment of the invention an NC machine for cutting parts having prescribed shapes from a material block includes an identifying means for each of said parts by one or more contour lines wherein the cutting tool cuts the workpiece along one of the identifying contour lines into one of said parts; a means to create at least one diversion, wherein said diversion has an associated opportunity, wherein the cutting tool cuts the workpiece along a contour line associated with the opportunity; and a means to resume the cutting of the part along the identifying contour line.

BRIEF DESCRIPTION OF THE DRAWINGS

FIG. 6b illustrates in more detail the first exemplary method for providing cutting opportunities shown in FIG. 6a;

FIG. 7b illustrates a cutting opportunity created using the exemplary method shown in FIG. 7a;

Figure 1:
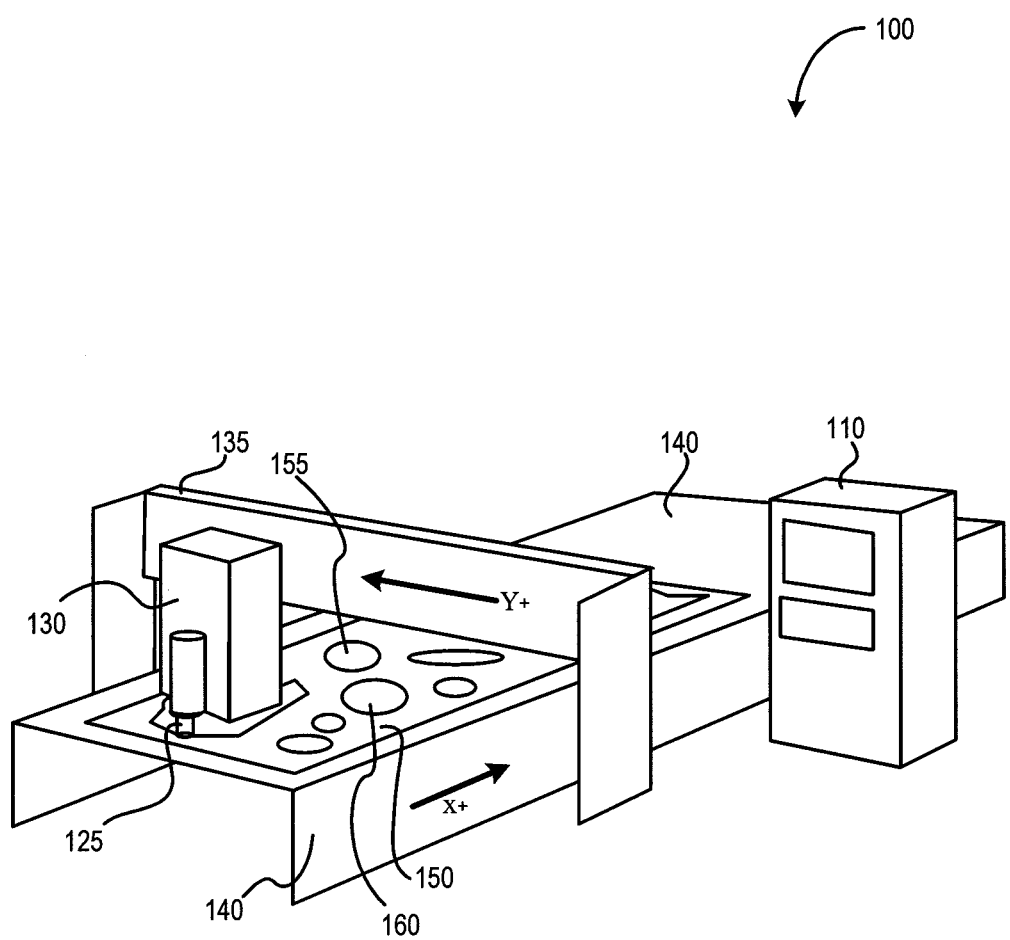
FIG. 1 illustrates a numeric control part cutting system of the present, invention.

It is to be understood that these drawings are solely for purposes of illustrating the concepts of the invention and are not intended as a definition of the limits of the invention. The embodiments shown in the figures herein and described in the accompanying detailed description are to be used as illustrative embodiments and should not be construed as the only manner of practicing the invention. Also, the same reference numerals, possibly supplemented with reference characters where appropriate, have been used to identify similar elements.

DETAILED DESCRIPTION OF THE INVENTION

A Numerical Control ("NC") machine or simply machine is a cutting machine with a numerical control unit that guides the path of the cutting tool. This machine typically requires a human readable list of coordinates and commands using the letters A-Z and the numbers 0-10. Additional characters usually include the period "." and the positive ("+") and negative signs ("−"). The orthogonal planar axes of the machine are usually designated by the letters "X" and "Y" although in some programming languages this is implied by position in the line of text, the first being "X" and the second number being "Y". This list of movements and actions are typically known as an NC program. NC machines are used extensively in all manufacturing industries. The ones of interest in this invention are those known as 'profiling' machines for oxyacetylene, plasma, laser, and/or water jet applications with flat sheet or plate material. The machine in FIG. 1 includes the elements of the present invention such as a tool having the direct head unit 130 and cutting head or tool 125; a bed or platform 140. The production of parts from materials, such as steel, aluminum, plastic, flow from a novel method and machine that directs the cutting tool along a cutting contour line while locating sectors on the workpiece where there is an opportunity to cut material to facilitate and optimize the time and materials required to manufacture a plurality of parts. The associated computer is programmed to create cutting opportunities among a plurality of parts comprising the steps of: identifying each of said parts by one or more contour lines; and creating at least one diversion along the contour line, wherein said diversion has one or more associated cutting opportunities to be more fully explained below. In this novel system, the NC unit 110 is represented as a dedicated computer system that operates to execute coded instructions in accordance with the objects of the present invention to direct head unit 130 to move along a track attached to gantry 135, i.e., Y+ direction. Control unit 110 may further direct gantry 135 to move along a track parallel to the bed 140, i.e., X+ direction. The combined motions usually provide for straight line movement and circular movement in the X/Y plane. The cutting head 125, e.g., a torch or laser, is mounted on head unit 130 and directed to cut shapes of parts 155, 160 from the material for example, on part sheet 150. NC system 100 may be associated with any of the non-contact cutting technologies previously discussed.

Figure 2:
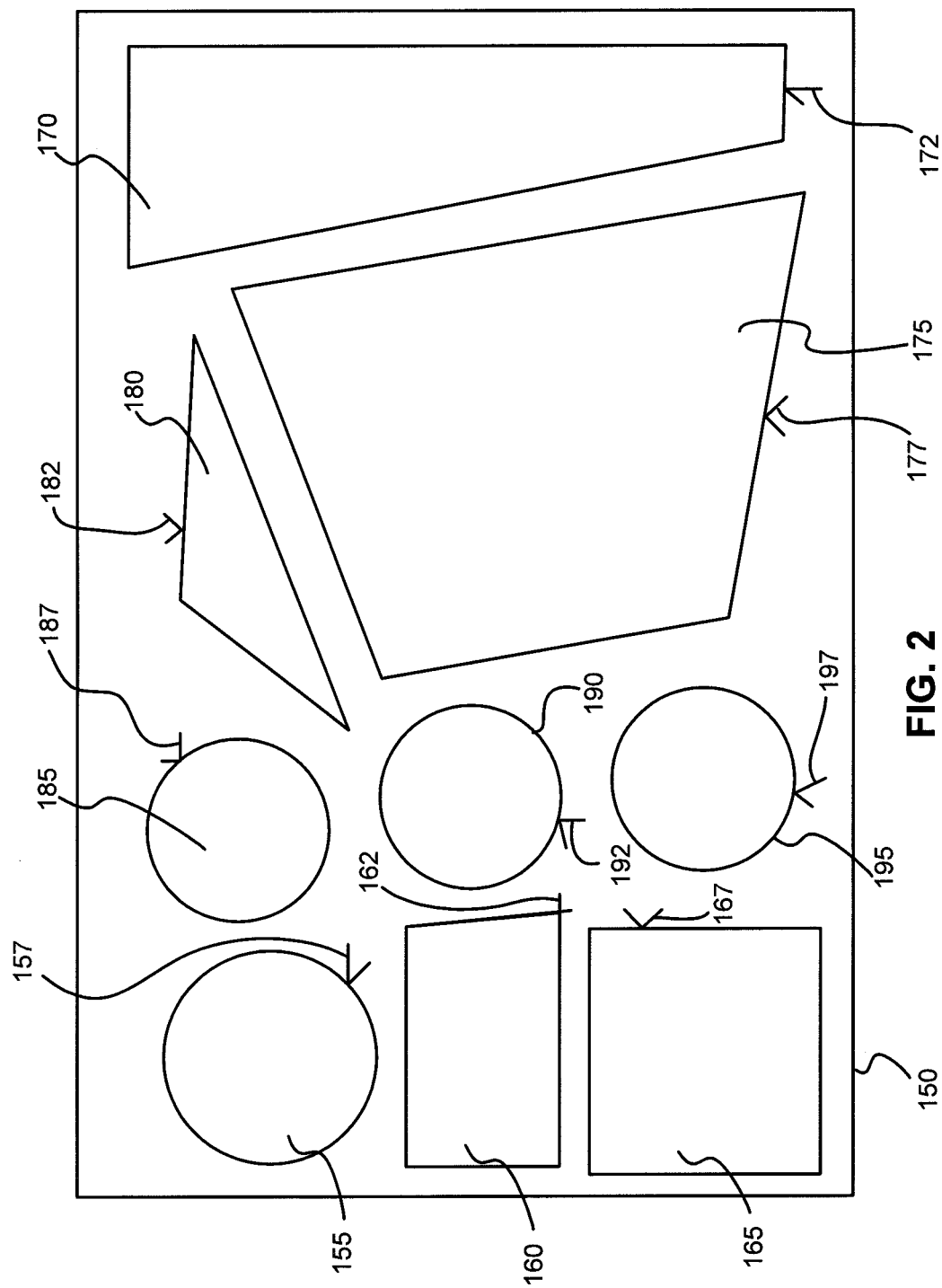
FIG. 2 illustrates a conventional rectangular sheet or plate showing idealistic shapes to be cut using conventional technology.

FIG. 2 illustrates an exemplary parts sheet 150 depicting a plurality of parts 155, 160, 165, 170, 175, 180, 185, 190 and 195. The parts shown herein are geometric shapes that may be idealized in the form of circles, discs, squares, and rectangles, etc., however, in practice, parts can be very complex that may include combinations of simpler geometric shapes. Conventionally, a set of parts placed on a sheet of plate 150 to be cut in one operation is referred to as a "nest". It is important to note that additional geometry and plate cutting which comes from the addition of entries and exits for pierces can dramatically affect the position of parts in a nest and the spacing between parts in a nest. For example, the size of the pierce significantly influences the spacing that may be allowed between parts.

Also illustrated are associated "pierce points" 157, 162, 167, 172, 177, 182, 187, 192 and 197. As discussed previously, conventional cutting processes are fundamentally edge cutting techniques that require a pierce or hole to be created adjacent to the desired part. One skilled in the art would recognize the pierce points, e.g., 157, must be positioned in a manner to prevent damage to the desired part as this initial hole or entry point can be much larger than the nominal "kerf" of the cutting tool, for example. Conventionally, torches generally produce a round hole, the radius of which is known or referred to as the "kerf." This is half the width of a line cut with a round torch.

The measure of the kerf is also critical to cutting as a cutting tool cannot follow the exact geometry of a profile or contour. If the exact geometry were followed the resultant part would be too small or a hole too big. Thus when cutting a shape, the torch center must be kept a 'kerf distance' from the shape profile so that the part cut is the right size. This offsetting of the desired shape to the center of the torch is known as 'kerf compensation' and is one of the more demanding functions performed by an NC control. With regard to the principles of this invention, kerf shall hereinafter refer to substantially one-half the width of the line cut by the cutting tool, whether the cutting tool is a torch, laser, Water Jet, etc. Kerf can be very small on lasers and sheet metal, typically in the order of 0.10 mm, while with thicker materials, e.g., 2 inches or 50 mm plates, the kerf can be in the order of 4 mm for a total torch cut width of 8 mm.

The cutter path is represented in a program to direct the machine to follow the contours of the parts. In essence, it is a series of lines and arcs which the machine will follow as directed by the program, with the cutting turning on and off as directed. This path must include all the niceties of entries, exits, part sequencing and kerf direction. Typically the cutter path follows the desired geometry of the part and the controller has the job of producing tool positions which allow for the width or radius of the cutting process. This is the offset cutter path.

Figure 3:
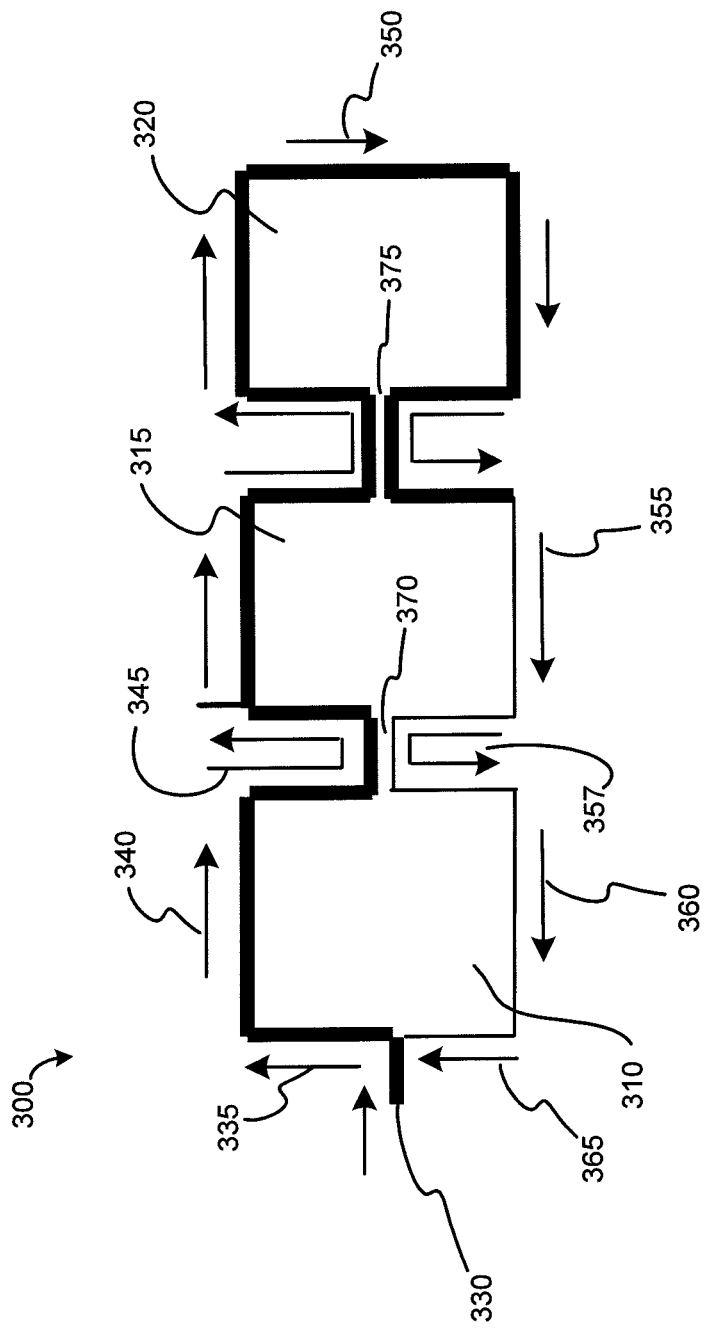
FIG. 3 illustrates a common conventional method for cutting parts from a sheet while minimizing pierces.

FIG. 3 illustrates one exemplary method 300 for cutting multiple parts using a single pierce. In this exemplary method, referred to as "bridging," parts 310, 315 and 320 are substantially identical and arranged along a common axis. With reference to a metal torch cutting technology, a pierce 330 is made at the beginning of the cutting path. The torch is then directed to follow the contour, within the limit of the kerf, as represented by arrows 335, 340, 345, 350, 355, 357, 360 and 365 to separate parts 310, 315 and 320 from the surrounding material. However, bridges 370 and 375 remain to connect parts 310, 315 and 320 together as the contour path, represented by arrows 345 and 357, for example, are not sufficiently long enough to completely isolate the parts from one another. Bridges 370 and 375 are then separately removed with a hand torch to fully isolate the parts 310, 315 and 320. As would he recognized by those skilled in the art, the broader and darker contour lines are representative of path lines cut while the lighter contour lines are path lines yet to be cut.

Positive bridging has advantages as there are fewer pierces, closer nesting of parts and, when appropriate, the whole nest of parts can be picked up and delivered as a single unit for subsequent separation. However, this method has the disadvantage that the parts must he manually separated and the arrangement requires that all parts be cut with the first part cut the last part to be finished. In this case, part distortion may occur through cumulative plate movement caused by heating of the plate.

Figure 4:
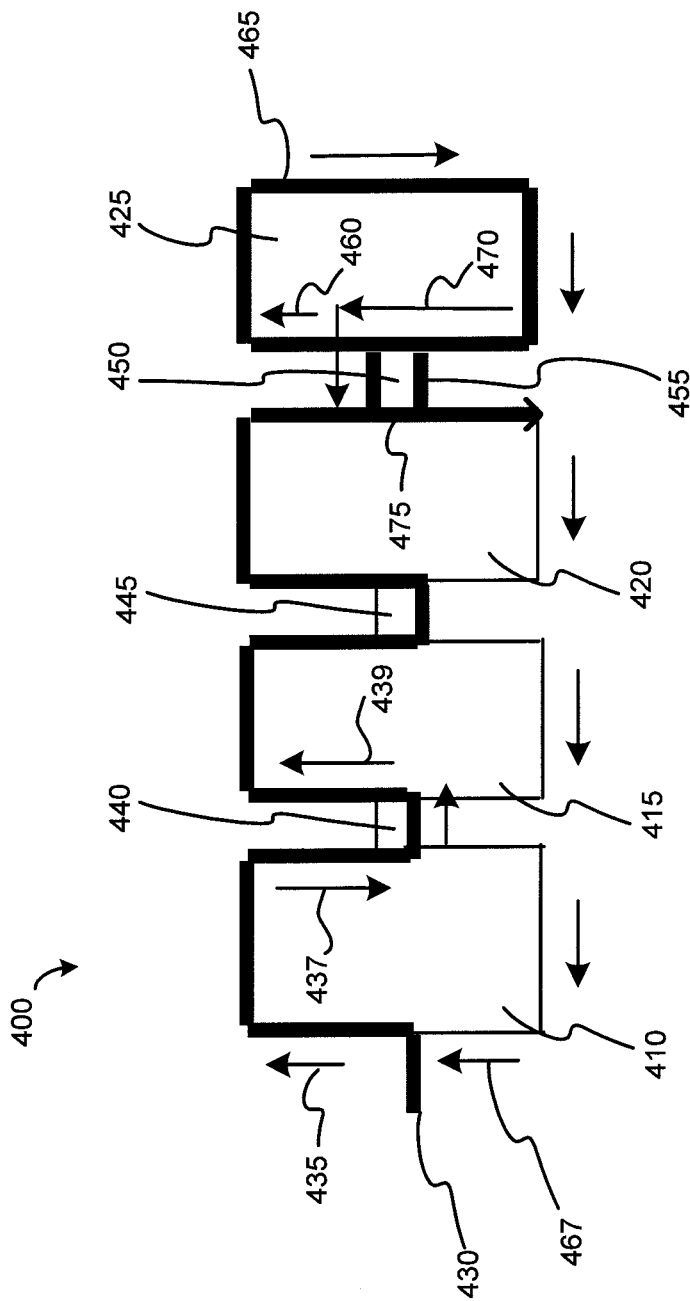
FIG. 4 illustrates a second method for cutting parts from a sheet.

FIG. 4 illustrates a second less conventional method 400 for cutting multiple parts using a single pierce. In this exemplary method, referred to as "negative bridging" by the author, parts 410, 415, 420 and 425 are substantially identical and arranged along a common axis. Again, with reference to a metal torch cutting technology, a pierce 430 is made at the beginning of the cutting path. The torch is then directed to follow the contour, within the limit of the kerf, as represented by arrows 435 through 467 to separate parts 410, 415, 420 and 425 from the surrounding material. However, in this case, the bridge connecting the parts is cut in an overlapping manner to retain the bridge until the part is fully separated. For example, the torch cutting path represented by arrow 437, extends to the bottom of bridge 440 before proceeding to cut part 415. On the return cut, represented by arrow 439, the cutting path extends to the top of bridge 440. As the cutting path continues along the top of bridge 440 and intersects the path represented by arrow 437, part 415 is separated by the surrounding material and adjacent part 410.

Negative bridging is advantageous as there are fewer pierces per plate, closer nesting of parts and no additional work is required to separate the parts after the cut is complete. However, this method has disadvantages in that parts separate during the cutting process so partially cut parts may move as adjacent parts are removed. It is also important to note that negative bridging is not used in the cutting art but represents an extension of the bridging technique shown in FIG. 3. Negative-bridging is not used because it is not well understood and is difficult to automate.

Figure 5A:
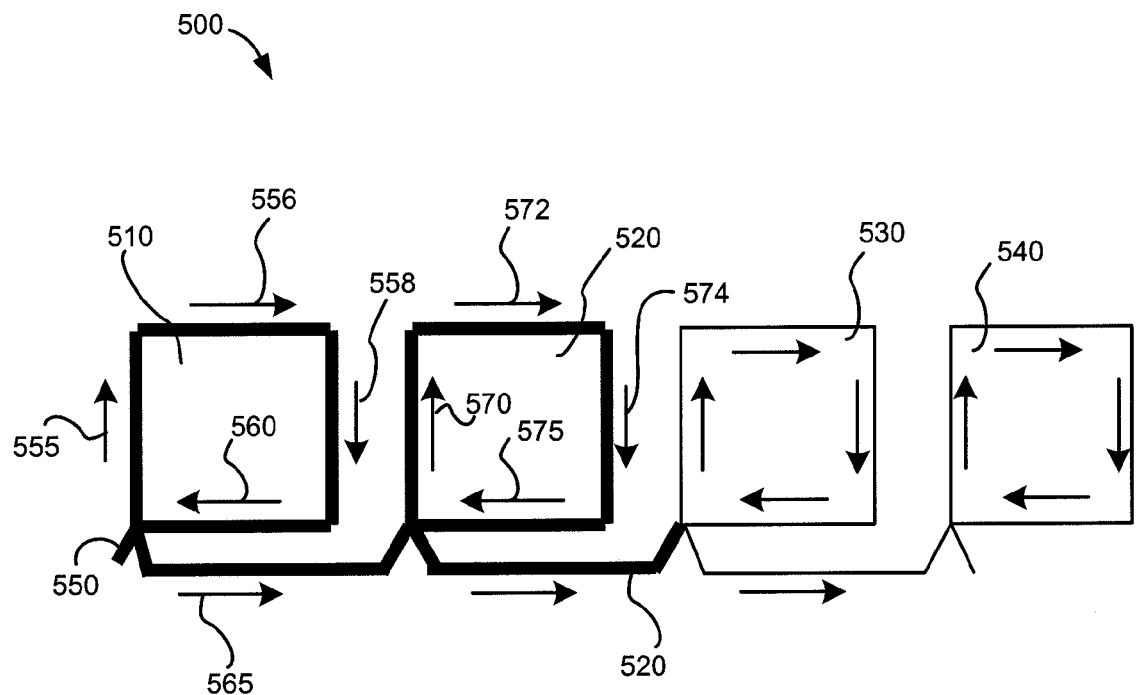
FIG. 5a illustrates another conventional method for cutting parts from a sheet with minimal pierces.

FIG. 5a illustrates an example of a conventional chain cut method or technique 500 wherein multiple parts are cut using a single pierce point. In this example, parts 510, 520, 530 and 540 are substantially identical and arranged along a common axis. A pierce 550 is initiated and the torch path associated with part 510 is represented by arrows 555, 556, 558 and 560. When path 560 intersects path 555, part 510 is separated from the surrounding material. The torch continues cutting the material allowing path 565 to reach part 520. Similar to part 510, the torch cuts part 520 by continuing along the cutting path represented by arrows 570, 572, 574 and 575. Chain cutting is advantageous in that one pierce is used for a string of parts and there is a decrease in the time to cut the parts because of the fewer pierces. However, there is more cutting required to traverse from one part to another, which results in wasted material and machine time. While wasteful of time and material, this technique is used extensively in non-NC line-following machines, as it does not require operator intervention to cut multiple parts.

Figure 5B:
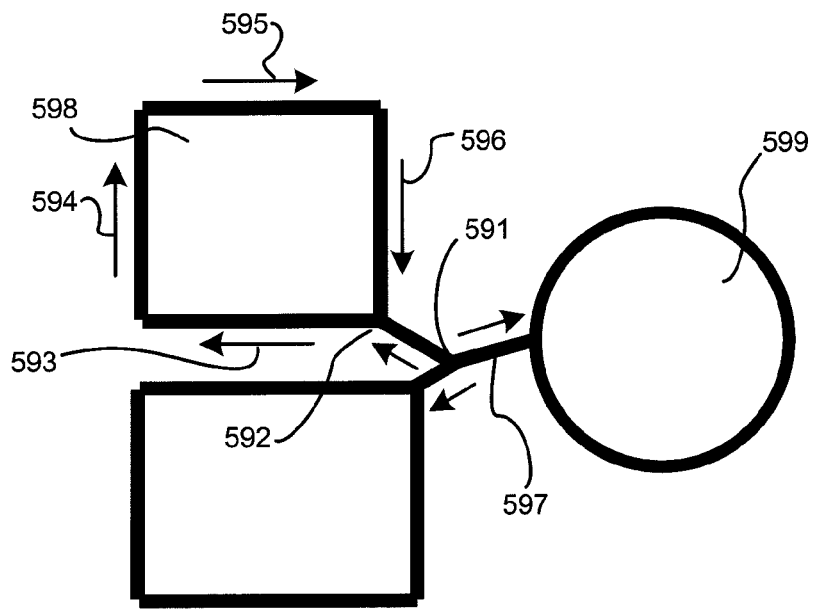
FIG. 5b illustrates still another conventional method for cutting parts from a sheet with minimal pierces.

FIG. 5b illustrates a second method for cutting multiple parts with a single pierce, which is referred to herein as Star piercing. In this method, part 598 is separated from the surrounding material by creating pierce point 591 and then following cutting vectors 593, 594, 595, 596. Cutting vector line 592 is then followed, possibly with the cutting tool turned off, to pierce point 591. A similar procedure is then repeated for part number 599, wherein the cutting tool proceeds along vector line 597 to the contour line (minus at least the cutting tool kerf), cutting along part 599 contour line and returning along 597. While this gives a form of efficiency in reuse of a costly and damaging pierce and less expensive cutting than the chain cutting of FIG. 5*a*, there is still the need to create a pierce for each star grouping.

Figure 6A:
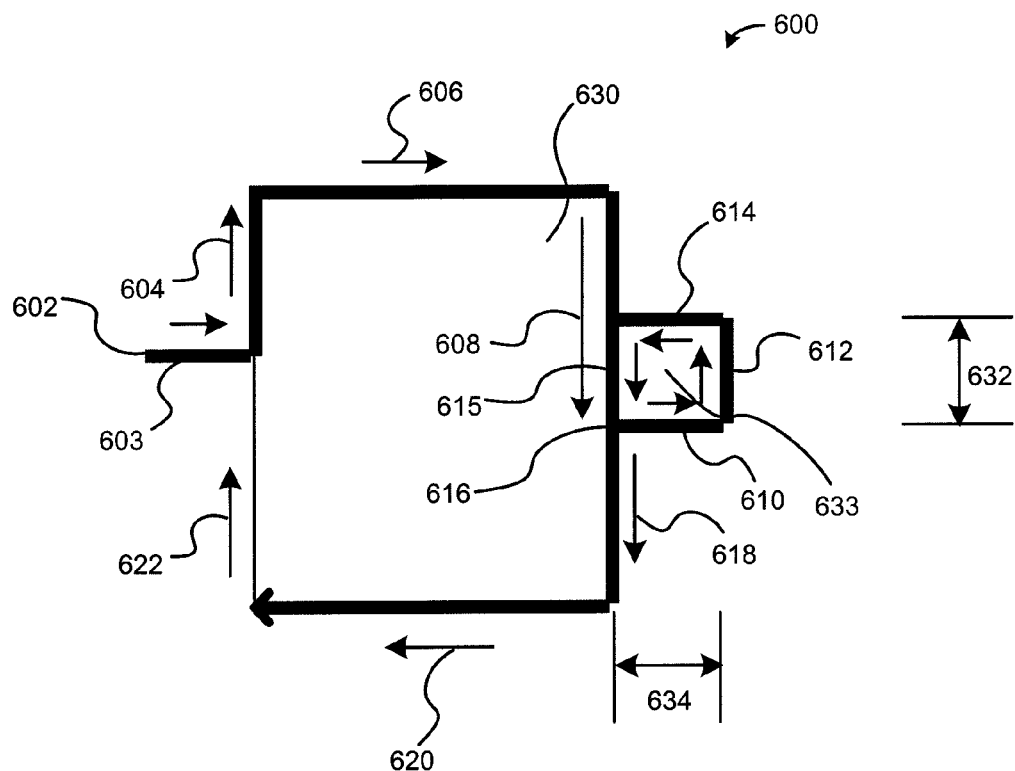
FIG. 6a. illustrates a first exemplary method for providing cutting opportunities in accordance with the principles of the invention.

FIG. 5*a* illustrates a method for creating cutting opportunities among a plurality of parts in accordance with the principles of the present invention comprising the steps of: identifying each of said parts by one or more contour lines; and creating at least one diversion along the contour line, wherein the diversion has one or more associated cutting opportunities. FIG. 6*a* shows a method 600 for cutting parts from a supporting material, i.e., a parts sheets in accordance with the principles of the present invention. In this illustrated method, pierce 602 is initiated in accordance with methods as previously discussed, and a cutting tool, e.g., a torch, may begin the process of separating part 630 from the surrounding material by cutting along the contour lines, represented by vectors or arrows 603, 604, 606 and 608. The torch is then diverted, at point 616, and proceeds to create an opportunity, a bump or an edge, by proceeding along vectors or arrows 610,612,614. Opportunity 633 is completed when the cutting tool returns to point 616 along contour line 615, which has already been cut. Part 630 is separated by cutting along part 630 contour lines represented by arrows 618, 620 and 622.

As would be recognized by those skilled in the art, movement along the contour line 615 may be performed with the cutting torch on or off. With some torches, it will be a requirement to turn the torch off to prevent widening of the path. With other torches or cutting tools this will not be necessary. This is dependent on the type of torch and the physical size of the opportunity as shown in the 'restart or cutting opportunity width' and 'restart or cutting opportunity height', i.e., the cutting opportunity dimensions. The smaller the opportunity, the less need there is to turn the torch off. Further, depending on the speed of cutting, it may be necessary to pause the torch at the material reentry point 616 if the material has cooled.

In accordance with the principles of the invention, every time a part is cut, one or more of these "opportunities", bumps or edges, are created in the outline as a start point for an adjacent part. The exact shape of these opportunities is specific to the type of material and cutting process and thickness of material. As would be recognized, the width 632 and the height 634 of the cutting opportunity may be determined by the kerf of the torch used. It is important to note that the crossing of an already cut path is generally prohibited in the art because of the risk of losing the cut with cooling at the point 616 and with the scavenging of the torch and widening of the cut with some cutting technologies such as plasma arc cutting.

Figure 6B:
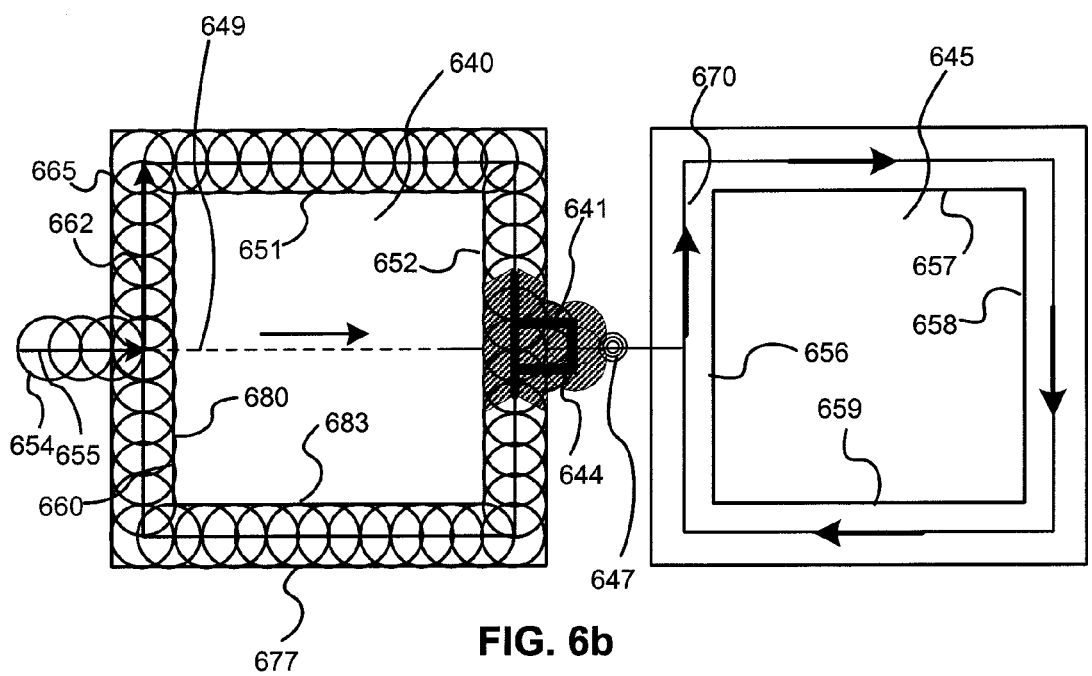

FIG. 6*b* illustrates in more detail the process of creating the cutting opportunity in accordance with the principles of the invention shown in FIG. 6*a* wherein at least two parts having prescribed shapes are to be cut from a workpiece. In one embodiment the process includes the steps of identifying each of said parts by one or more contour lines; cutting the workpiece along one of the identifying contour lines into one of said parts; creating at least one diversion, wherein the diversion has an associated opportunity; cutting the workpiece along a contour line associated with the opportunity; and then resuming the cutting of the part along the identifying contour line. The method typically proceeds by then moving the cutting tool to the opportunity and to an associated adjacent identifying contour line and then repeating the process. In this example, parts 640 and 645 are adjacently located. Part 640 is defined by part or contour lines 750-753 and part 645 is defined by part or contour line 656-658. In this case, pierce point 655 is created and the cut proceeds toward contour line 650. As the cutting torch has an associated finite cutting width, i.e., twice the kerf, the cutting torch is positioned substantially a kerf width from desired contour line, 650. The cutting torch then proceeds along vector line 662 to cut and separate part 640 from the surrounding material. In this case, the cutting torch proceeds in a clockwise direction a known distance, i.e., kerf width, from each of the contour lines 651, 652, and 653.

As the cutting torch proceeds parallel to contour line 652, it is diverted along path 641, i.e., vectors 652, 654, 656, 658 in FIG. 6*a*, to create cutting opportunity 644. In this case, the size of cutting opportunity 644 is substantially comparable to twice the width of the cutting torch width. Hence, the material in cutting opportunity 644 is removed by the cutting process and not simply separated from the material.

When the cutting torch returns to the initial point, along path 660, part 640 is separated from the surrounding material. The cutting tool is moved along said contour line associated with the first part at a uniform speed. The cutting torch may then be turned off and rapidly the cutting tool is moved along vector 649 to an adjacent part contour line at a second uniform speed to cutting opportunity 647 and again turned on to begin separating part 645 from the surrounding material. In this case, the starting edge is represented by point 647, which is representative of the outside edge of the cut made by the cutting torch.

As would be recognized by those skilled in the art, the creation and use of cutting opportunity 644 is advantageous as it removed the need for piecing the surrounding material to obtain an entry point for the start of the cut. Additionally, a process may generate a succession of opportunities to be followed by a cutting process during movements of the working portion of the cutting tool.

Furthermore, the size of cutting opportunity is sufficiently large enough to prevent damage to the previously cut part by positioning the cutting torch sufficiently far from the part. In one aspect of the invention, parts 640 and 645 may be positioned as close as 4 times the kerf radius without expecting damage to part edges as there is no pierce damage between the parts.

Figure 7A:
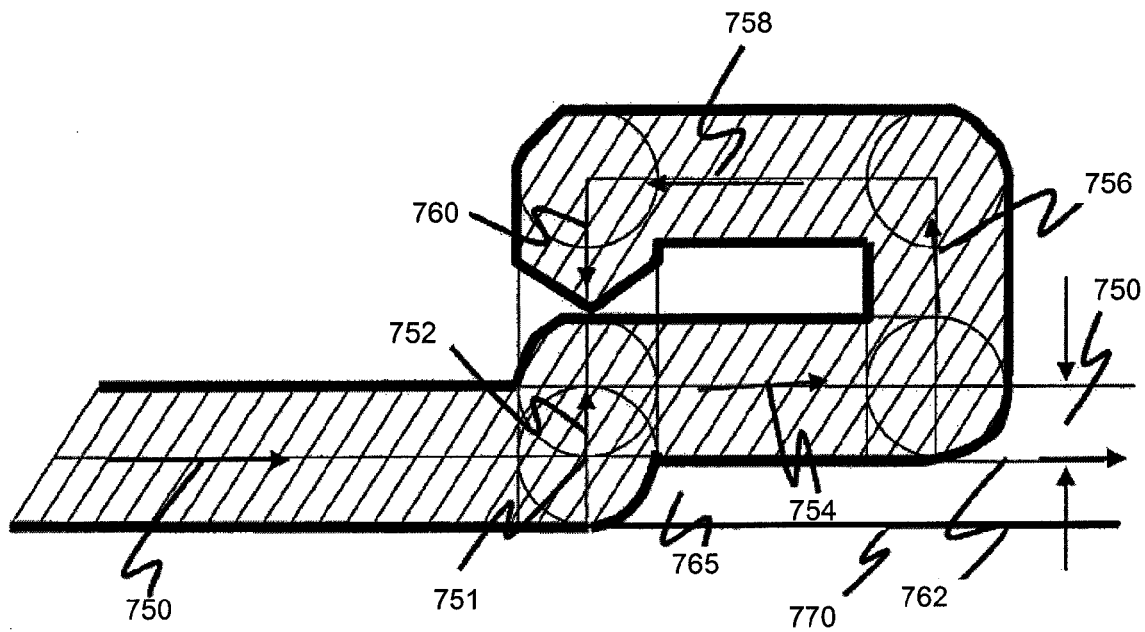
FIG. 7a illustrates a second exemplary method for providing cutting opportunities in accordance with the principles of the invention.

In the cutting operation shown in FIGS. 6*a* and 6*b*, movement over path 615 involves cutting over a path which has already been cut. In some materials or cutting operations, e.g., plasma, this movement may cause damage to the part edge. FIG. 7*a* illustrates a second aspect of creating a cutting opportunity in accordance with the principles of the invention that produces minimal damage to the part being cut. In this aspect of the invention, cutting starts as previously described along center line 750 to cut along part line 770. At point 751, the cutting tool is stepped away from part edge 770 and continues along path line 754. In this manner, the cutting tool is positioned away from the part line 770 and the cut occurs along line 752, leaving uncut material 765. The cutting tool then proceeds along path lines 754, 756, 758 and 760 returning to point 751, where the cutting tool was initially stepped away from the part line 770.

The cutting tool then proceeds along path line 762 to complete the cutting along part line 770. Although it is shown that the cutting tool is stepped away from part line 770 by substantially one-half (½) the cutting tool kerf, it would be recognized by those skilled in the art that the step distance may be any distance and it would be important to return the cutting tool to a position to continue cutting along the desired part line.

Figure 7B:
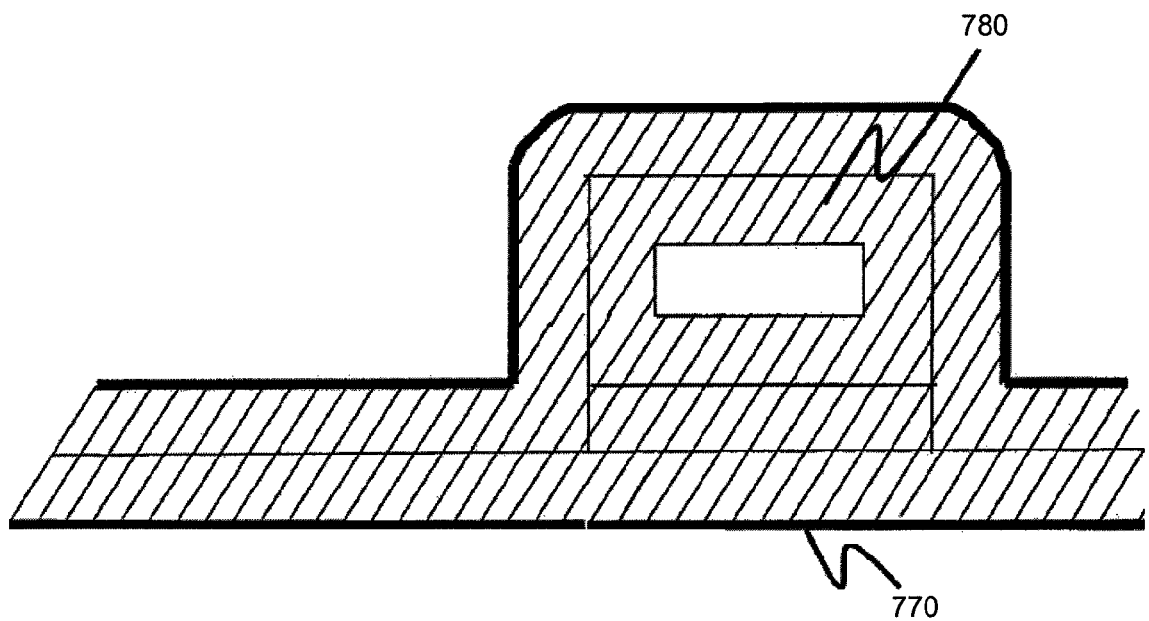

FIG. 7b illustrates the completion of the cutting process shown in FIG. 7a, wherein a smooth cut along part line 770 occurs. Also, as illustrated, the size and shape of the created cutting opportunity need not be limited to the twice the kerf width as shown in FIG. 6b. Rather, the cutting opportunity may be from such that material within the cutting opportunity, represented as 780 may be separated from the surrounding material in a manner similar to that of desired parts.

Figure 8:
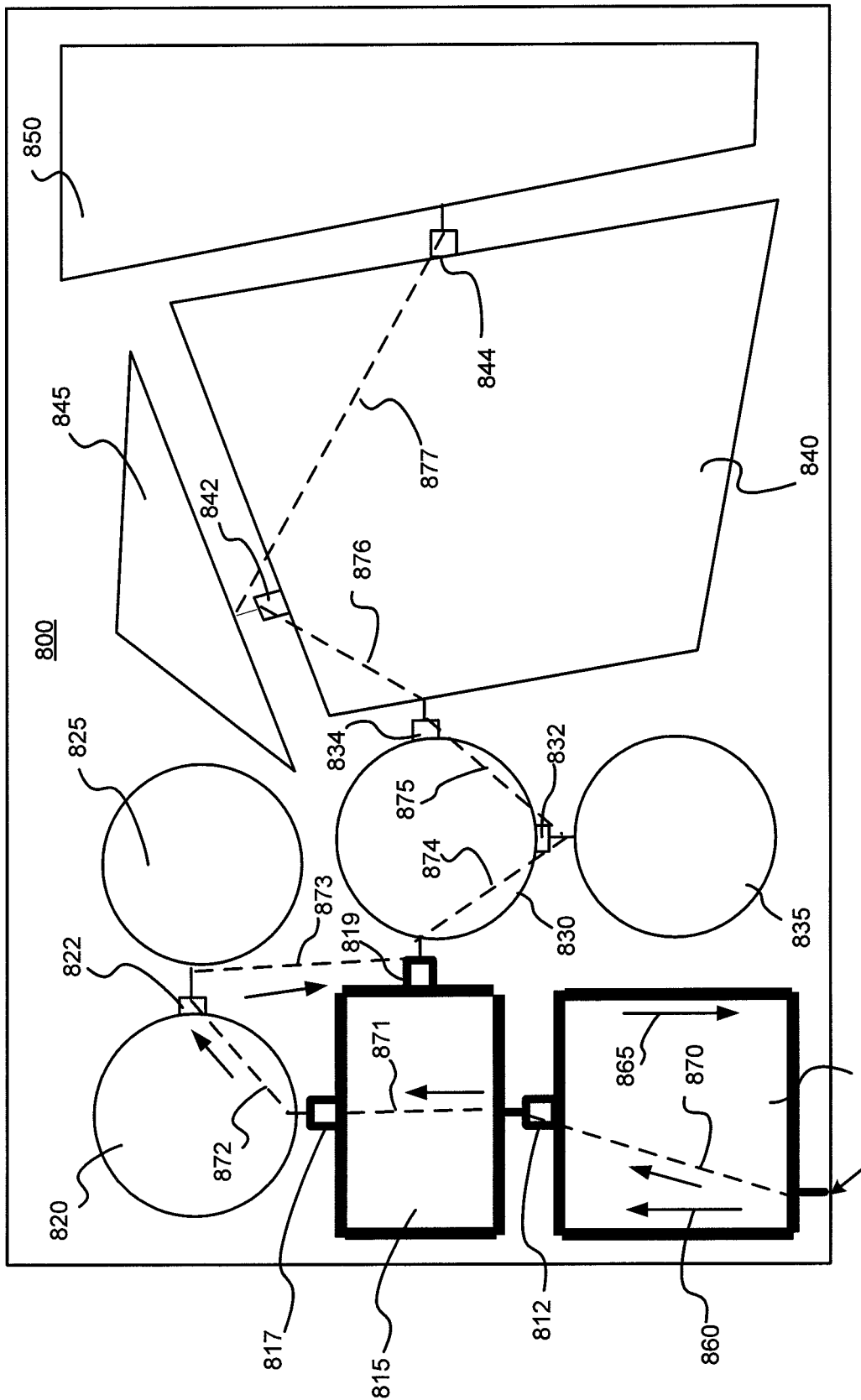
FIG. 8 illustrates an example for providing cutting opportunities in accordance with the principles of the invention.

FIG. 8 illustrates an example of the use of the principle of the present invention in separating a parts nest from a single sheet 800. In this case, parts 810, 815, 820, 825, 830, 835, 840, 845 and 850 are placed on sheet 800 using known methods. In some cases, the parts may be arranged arbitrarily, while in other cases, the parts may be arranged to maximize the number of parts on a workpiece or sheet. Therefore the process includes identifying each of the parts and arranging the contour lines to maximize the number of parts on a workpiece. For example, in one aspect of the invention, the parts may be placed to allow only a distance sufficient to create a cutting opportunity between parts. Therefore one aspect of the invention includes defining algorithms to identify the contour lines based upon a geometry of a part to be manufactured from cutting the workpiece.

Also illustrated are one or more cutting opportunities associated with the designated parts. For example, cutting opportunity 812 is associated with part 810 and provides an entry point for separating adjacent part 815 from the surrounding material. Similarly, cutting opportunity 817 is associated with part 815 and provides an entry point to begin the cutting process for separating part 820 from the surrounding material. In another aspect of the invention, cutting opportunities 832 and 834 are associated with part 830. In this case, cutting opportunity 832 provides an entry point to begin the cutting process for separating part 835 from the surrounding material, while opportunity 834 provides an entry point to begin the cutting process for separating part 840 from the surrounding material.

The methods used herein also may generate a succession of opportunities to be followed by said cutting tool during movements of the cutting tool to machine the workpiece and the accompanying steps of generating one or more motion commands to move the cutting tool along the contour line defined by the contour line processing means that the NC machine utilizes. Hence, as each part is separated from the surrounding material, an associated cutting opportunity provides an entry point to begin the cutting or separation process for a next or subsequent part. As the cutting opportunity is not distinguishable from normal cutting when examining the cut part, more than one opportunity may be generated per part. This in turn can be used to minimize waste travel between parts when appropriate. Additional opportunities may be used to cut to the edge of the plate and break up the remnant part of the material skeleton for removal. To be noted again are the signature rapid movements 870, 871, 872, 873, 874, 875, 876 and 877 in which the NC controlled torch is instructed to stop cutting and to move at very high speed to the new edge start opportunities at 812, 817, 822, 819, 832, 834, 842 and 844.

The machine and the process of creating parts within the spirit of the present invention typically requires means for specifying a tolerance between adjacent contour paths; executing one or more computer instructions to generate a sequence of move command commands, whereby each move command signal indicates a desired position of the cutting tool relative to a fiducial mark or reference point such as a location on the workpiece that constitutes a reference or such as a location on the NC platform, along the contour line paths and diversions relative to opportunities and opportunities relative to adjacent parts; moving the cutting tool relative to the reference point through a sequence of incremental moves in accordance with the move command commands, wherein, if the desired position, indicated by a current move command signal is a diversion on the programmed path, moving the tool relative to a reference point along the programmed contour line path until the position of the tool relative to a reference point is within an allowable distance from the opportunity, and once the position of the tool relative to the platform is within the allowable distance from the opportunity, moving the tool relative to a reference point towards a point on the programmed contour line path beyond the diversion in accordance with a next move command signal.

Figure 9:
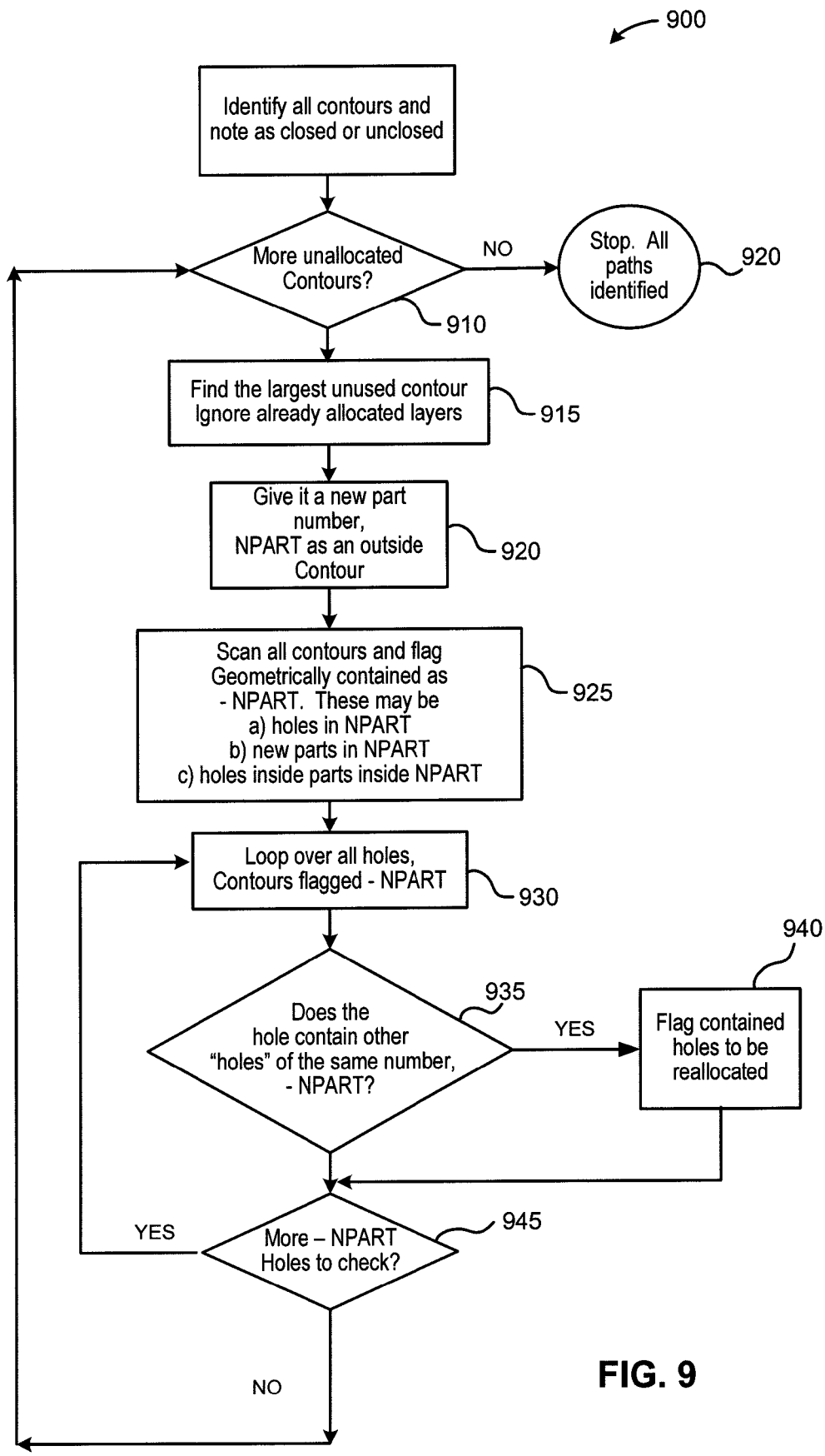
FIG. 9 illustrates a flow chart for identifying part contours in accordance with the principles of the invention.

FIG. 9 illustrates a flow chart of a process 900 for identifying and classifying external contours or part lines as parts and internal contours as holes and slits in accordance with one aspect of the invention. The coordinates of contour lines, opportunities and diversions may be computed using a computer aided design system. In the NC machine the process 900 is stored in a computer readable medium or computer file (collectively referred to as a "computer readable medium"), which executes a program to carry out the cutting operations described herein. In this case, the process includes a contour that is a sequence of lines or arcs, which form a curve. A closed or nearly closed contour is one where the end of the contour meets or substantially meets the start. This can be either a part boundary or a hole within a part. Allowance also has to be made for slits, which are unclosed contours of even part marking such as text on the part. At block 905 all contours are identified and classified as to whether they are closed or unclosed. At 910 a determination is made whether any unallocated contours remain. If the answer is in the affirmative, then at 915 the next largest unallocated part or part contour is selected.

At block 915 the largest remaining external part contour is selected. At block 920 the part is identified by assigning an identification number. In one aspect the part number is incremented from the last identification number. In another aspect, a temporary sequential part negative number is associated with contours, which are inside this, bounding contours or identified parts.

At block 925 all the identified contours and those which are wholly geometrically contained in the selected bounding contour are allocated the same part number as a negative number, −npart. These are most typically holes in the selected part but we have to allow for the possibility of a heavily nested plate with parts inside parts. Thus a contained contour may be a whole of even the external contour of another internally nested part or a hole in such a nested part or even a part within a part within a part. This logic has to allow for endless internal nesting of parts as in the Russian nesting dolls (Matrioshka), parts within parts within parts and so on.

Thus to eliminate internally nested parts and part contours, at block 935, each identified hole is examined further to see if it also has wholly contained contours. If the answer is in the affirmative, then such contained contours are removed from the current determination as belonging to the current parts. By elimination, those contours that do not contain other contours are simply holes in the bounding part contour.

Processing then proceeds to block 945, wherein a determination is made whether more contours of identification −npart are to be checked. If the answer is in the affirmative, then processing continues at block 930. However, if the answer is negative, then there are more parts to be identified and processing continues at block 910. Any contours eliminated at step 935 are then made available for reexamination. These contours are going to be associated with parts nested within other parts. Contours identified as parts are no longer available and the second largest part will be identified at 915.

Figure 10:
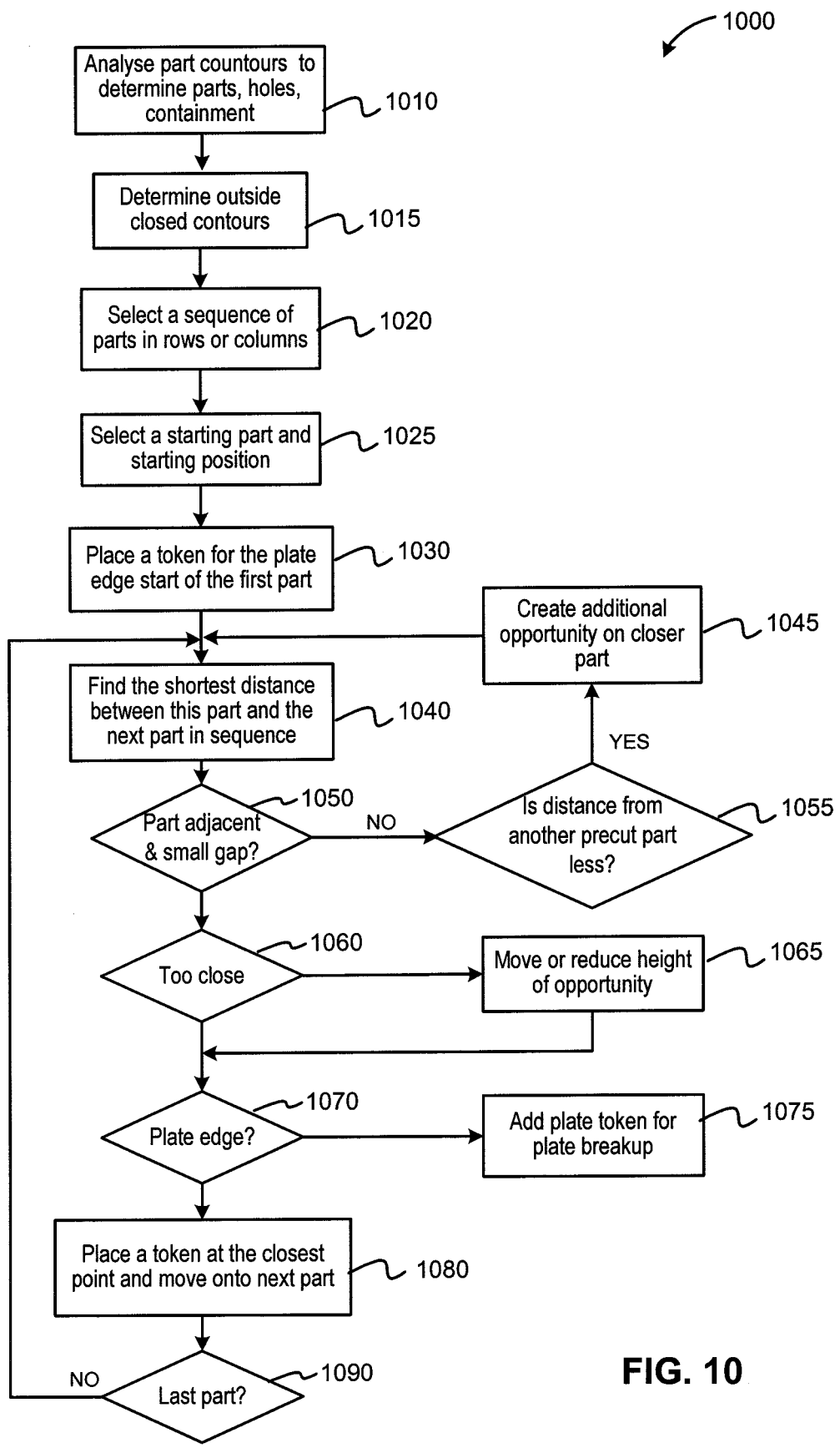
FIG. 10 illustrates a flow chart for identifying cutting opportunities in accordance with the principles of the invention.

When all contours have been classified and identified, the allocation process is halted at block 920. At this point, each contour has a part number, positive for an external boundary and negative for an internal boundary of the same part. Further, internal contours are identified as holes or slits, which has processing significance for allocation of kerf, but which is not otherwise significant in the invention. Also, the total number of parts has been determined. FIG. 10 illustrates a flow chart of a process 1000 for determining cutting opportunities in accordance with the principles of the present invention. In this case, after parts are defined on a sheet, the part contours are analyzed at block 1010 and identified at 1015, which is described with regard to FIG. 9. The process 900 may include methods of creating contour line paths, diversion points and opportunities utilizing programs that form tables and arrays that include the X-Y coordinates that constitute the various cutting paths. These may typically consist of calculating a plurality of points representing the first contour lines and subsequent contour line.

At block 1020 parts are organized into a sequence of cuts using rough rows and columns, for example. At 1025, a start point is selected for each part as close as possible to the previous part. For the first part, the closest point of the part to the edge of the plate is selected. At 1030 a graphic token is placed on the screen to identify the chosen position. In one aspect of the invention, the operator for personal preferences may move this token but it has been selected to be as close as possible, in a clean section of the contour away from complex detail and in an area where there is sufficient space to place the cutting opportunity or pierce point.

At block 1040 the shortest distance between a selected part and adjacent parts is determined. At block 1050 a determination is made whether the distance is within a known small gap. If the answer is negative, then a determination is made at block 1055 whether the distance to the adjacent part from a precut part is less. If the answer is in the affirmative, then at block 1045 a cutting opportunity is created on the closer part.

However, if the answer is in the negative, then a determination is made at block 1060 whether the determined gap is considered too close. If the answer is in the affirmative, then at block 1065 the size of the opportunity is alternated. However, if the answer is in the negative, then a determination is made at block 1070 whether a plate edge has been detected. If the answer is in the affirmative, then a plate token is added at block 1075. Otherwise, a cutting opportunity token is placed at the closest point at block 1080 and the next part is selected. At block 1090 a determination is made whether all the parts have been selected. If the answer is in the negative, then processing continues at block 1040 to determine at least one cutting opportunity in the next part.

Figure 11:
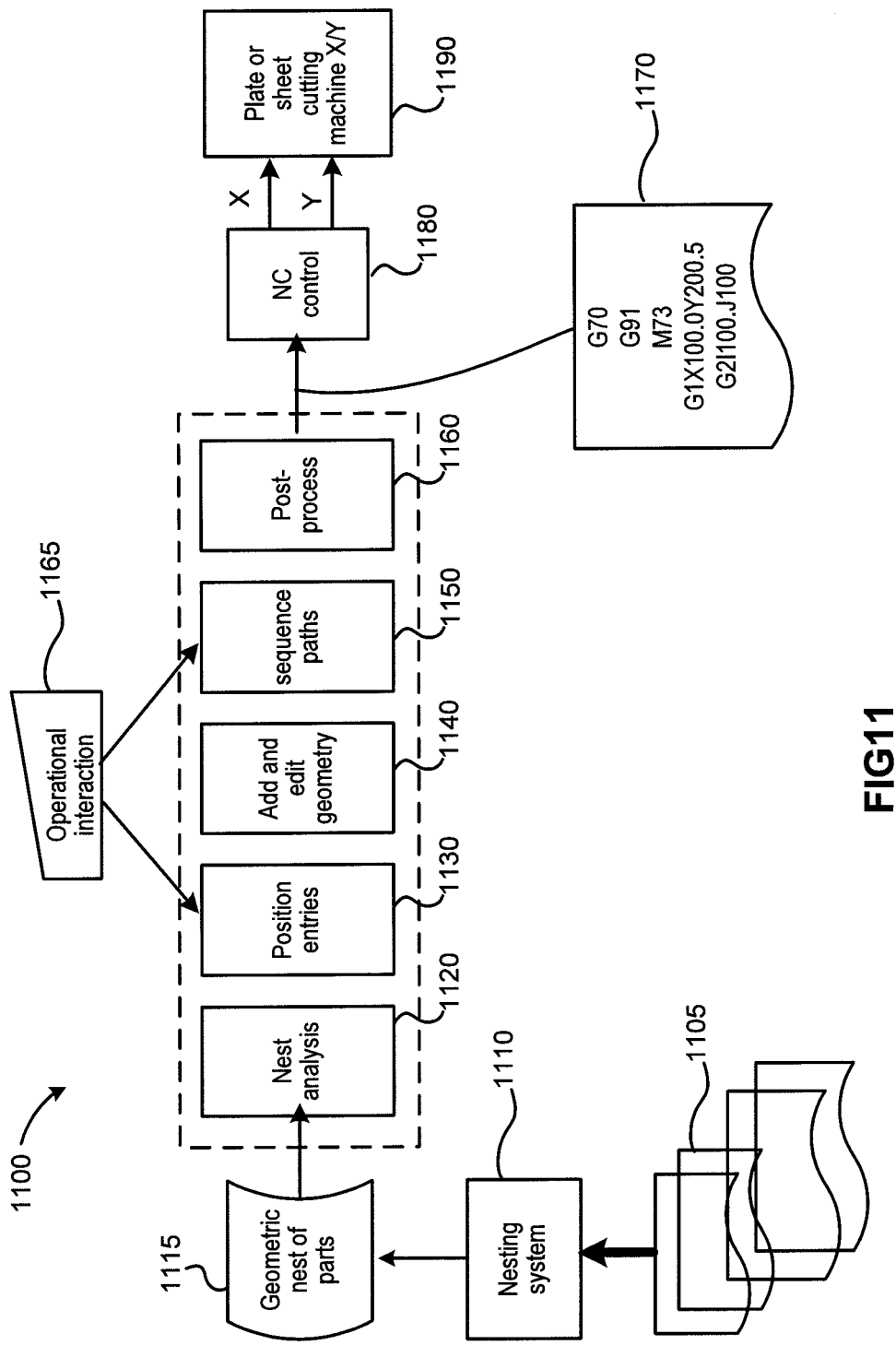
FIG. 11 illustrates a process flow for performing the operations shown herein.

FIG. 11 illustrates a process flow 1100 implementing the principles of the invention as depicted in the exemplary processing shown herein. The process flow creates a plurality of cutting process-generating conditions, which individually and together carry out the purposes of the invention. For example, the process flow begins with a generating condition in the creation of a file 1105 containing all the geometric movements 1115, which constitute a part or a nest of parts on a plate 1110. These geometric entities are lines and arcs and points, as previously discussed. The nest is analyzed at block 1120 and entries and opportunities are determined at block 1130 as described. In one aspect, allowance for operators to interact with entries, exits and cutting opportunities is made available at block 1165. Operator interaction is useful to reduce the burden on the automatons functions in avoiding upturned parts, avoiding clamps or holes in the material and other preferences, which are specific to the operation and outside the general definition of the problem. At block 1140 geometric construction is necessary to add and edit the movements and entities, which allow the creation of edge start opportunities.

At block 1150 sequencing of the cutting of holes and parts is sufficiently well known in the art and need not be discussed in detail herein. At block 1160 the conversion of contours into the NC code is performed. An exemplary example of which is shown at block 1170. The NC code is transmitted to the NC controller represented as block 1180, which converts the codes into movements of the cutting torch or torches.

Within the foregoing descriptions of the inventive methodology the NC machine of FIG. 1 includes a programmable control unit 110 such as a computer, which is programmed to control the movement of the cutting head in accordance with processes 900 through process 1100 along the programmed path, wherein, once the drive assembly 135 moves the tool 130 relative to the platform 140 to a position that is within an allowable distance from a diversion of the programmed path, the tool 130 is moved relative to the platform 140 towards an opportunity on the programmed path beyond the diversion.

The method for creating opportunities for edge start cutting includes adding machine movements to the original profile which achieves the aims of creating an opportunity of sufficient size and appropriate shape to allow the restarting of cutting on the edge of the material and avoids piercing returns to the original defining contour while avoiding damage to the part is of appropriate shape to minimize problems including loss of cut, excessive metal temperature and unintentional scavenging of adjacent material. The method also permits the machine to breakup of the skeleton left by the cutting of individual parts by creating additional opportunities specifically for cutting to the plate edge where required and producing fragmentation of the scrap skeleton for removal. The method illustrated is not specific to a particular geometric shape of the opportunity created and this will change dependent on the material and cutting process and various geometric shapes will suffice to achieve the objectives herein. The method of computing the optimum locations for the placement of opportunities facilitates plate break up by cutting to the plate edge from an opportunity creates reuse of opportunities so that cuts from opportunity to opportunity can be used to break up the remnant skeleton fully.

Figure 12:
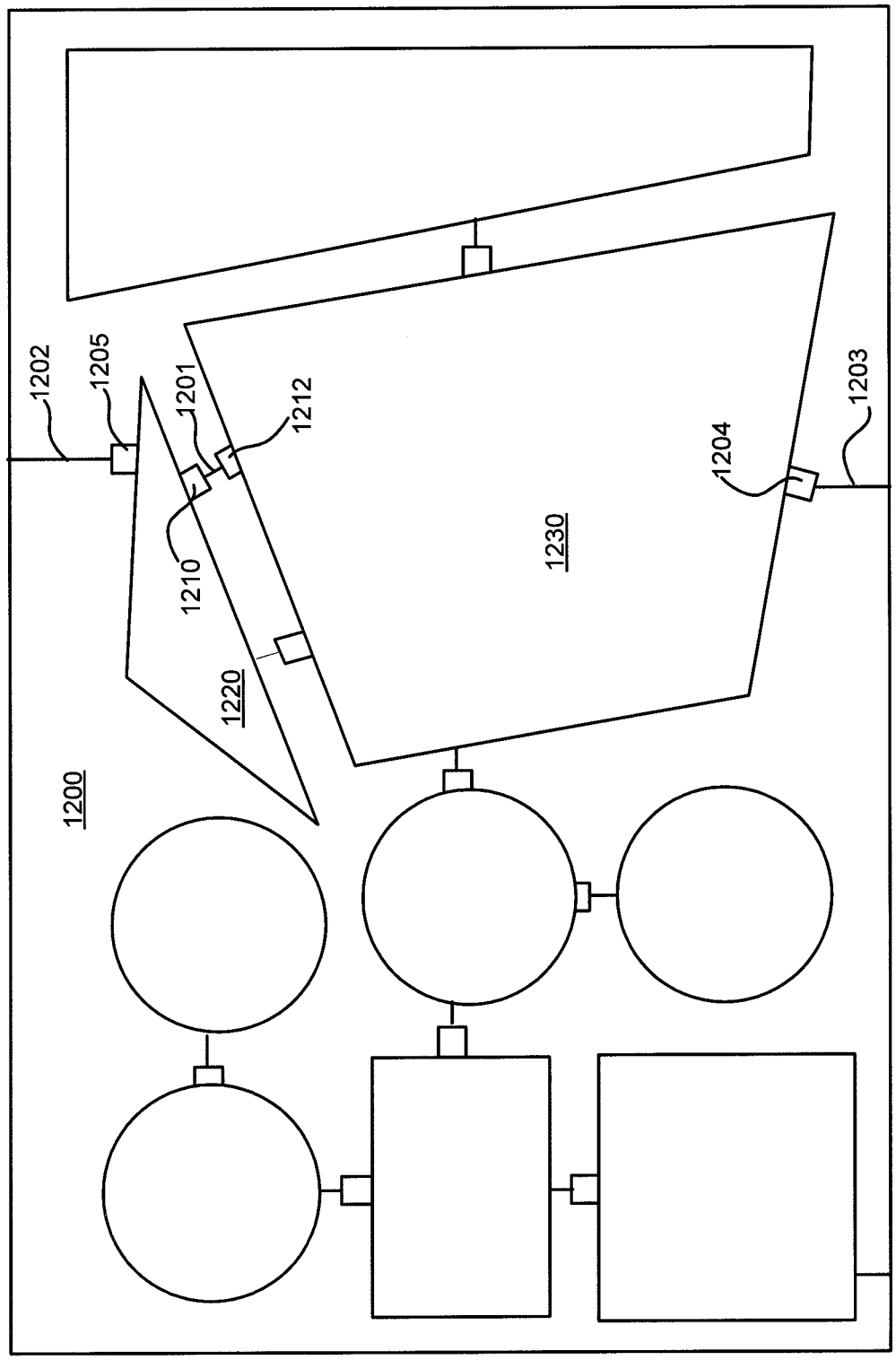
FIG. 12 illustrates use of the creation of opportunities to break up the remnant material in situ while cutting the parts from the material.

FIG. 12 illustrates a consequent and significant application of the creation of opportunities. At the same time that parts are cut from the material using opportunities to eliminate piercing where possible, the opportunity exists to create additional opportunities for the purpose of plate break up. Fully breaking up the remnant material can produce major savings in materials handling and improved worker safety. After the parts are cut and removed, the skeleton of material usually has to be broken into smaller pieces. Plate breakup is currently largely manual. As can be seen in FIG. 11, the use of opportunities leads to substantial fragmentation of the material remnant in any event as cuts join one remnant hole to an adjacent hole, connecting all profiles. However additional strategically placed opportunities can result in even smaller pieces and more complete breakup especially from part to plate edge. Most significantly, the use of opportunities allows this to be done in situ without damaging the parts to be removed. Normally parts have to be removed before any attempt at breakup of the skeleton. This in turn usually disturbs or bumps the remnant skeleton and makes breakup difficult to automate. A method of concurrent breakup therefore has great advantages.

FIG. 12 illustrates the creation of a largely vertical cut across the plate from top to bottom using parts 1220 and 1230 and additional cuts 1201, 1202, 1203 for this specific purpose. To do this, opportunity 1205 is created and the profile for part 1220 is then connected to the plate by cut 1202. Opportunities 1210 and 1212 are also created and the profiles for parts 1220 and 1230 are connected via cut 1201. Finally opportunity 1204 is created and used with cut 1203 to cut to the opposite plate edge. In this way a complete cut across the plate is made using cuts 1202, 1201 and 1203 and parts 1220 and 1230 so that the plate is broken completely across the vertical line in the diagram from the cuts 1202, 1205, 1220, 1210, 1201, 1212, 1230, 1204, 1203.

An embodiment of the present invention may be used to break up the plate as much as is required and represents a unique and novel method for breakup of remnant material, even while the parts are being cut from the material so that when cutting of all parts is complete, both the remnant and parts are ready for removal.

In this invention the machine as defined must have the ability to start cutting on a raw edge of material without performing a pierce cycle. The edge start ability is not itself claimed in this invention and is understood in the art but it is an essential concept of the invention that the edge start ability is intrinsic to the machine. In the art, most NC machines will attempt a traditional pierce cycle on starting cutting and this requires positioning wholly over plate. Generally plasma machines will refuse to start on a plate edge. It is a requirement that most NC machines have an edge start cycle available which permits and is specifically designed to facilitate starting the cut on a raw edge. It is also expected that an NC programming code will be allocated for this type of start as distinct from the common pierce cycle which automatically accompanies the start of cutting.

The machine of FIG. 1 therefore includes a computer programmed to select at least one of a plurality of opportunities followed by cutting process-generating conditions and to select at least one of a plurality of opportunities; a plurality of opportunity positions and the possibility of reuse of any given opportunity; a plurality of opportunity positions which can be used to facilitate incidental breakup of the material skeleton; to arrange the contour lines to allow minimum distance sufficient to create a cutting opportunity between adjacent parts; to arrange the contour lines to maximize the number of parts on a work piece; to generate a succession of opportunities followed by said cutting tool during movements of the cutting tool to machine said workpiece; to generate one or more motion commands to move said cutting tool along the contour line defined by said contour line process means; to move the cutting tool according to said motion commands; to generate said opportunities on the basis of the calculated interval, such that said opportunities are spaced apart from the following contour line by said interval in the direction of said succession.

As will be understood by those skilled in the art of machining, the sequencing and positioning of opportunities are calculated to optimize a sequence of cuts wherein the positions are dependent on a sequence of cutting of parts from the workpiece, which depends upon production requirements, heat dissipation, movements as a consequence of material stress relief and production preferences.

While it has been shown, described, and pointed out fundamental novel features of the present invention as applied to preferred embodiments thereof, it will be understood that various omissions and substitutions and changes in the apparatus described, in the form and details of the devices disclosed, and in their operation, may be made by those skilled in the art without departing from the spirit of the present invention. In particular there are many modifications and improvements currently available in the art, which can now be applied to this invention without changing the nature of the invention. They have not been detailed simply to maintain the simplicity and clarity of the idea. For example, although the present invention has been disclosed with regard to sheet and plate cutting technologies typically of metals, it would be recognized by those skilled in the art that the present invention may be used for many materials and machines. The fact is that all flat material has substantially the same problem from the stack cutting of cloth for suits and furniture to the cutting of leather for shoes. While the technology is most useful in the very large metal (steel and aluminum) industries, it is also applicable to timber, concrete, marble, glass, ceramic, mica, integrated circuit boards in fiberglass and even cutting of individual components on a silicon wafer. Basically any time flat material is cut, the problem is that the piercing of the material usually has to be achieved with a tool designed for optimum edge cutting, not piercing, as with a simple pair of scissors. However, by the use of this invention, edge cutting can be the normal and established practice of cutting plate, by the addition of process-generating conditions such as a mathematical formula and suitable algorithms to a geometric nest, changing the geometry to provide edge start opportunities as described and cut the entire nest of parts or trousers without piercing.

It is expressly intended that all combinations of those elements that perform substantially the same function in substantially the same way to achieve the same results are within the scope of the invention. Substitutions of elements from one described embodiment to another are also fully intended and contemplated.

The invention claimed is:

1. A machine for cutting a work piece into at least first and second parts having prescribed shapes, comprising:
   a cutting tool;
   means for causing the cutting tool to cut the work piece into the first part along first contour lines;
   means for causing the cutting tool to cut at least one diversion along diversion contour lines to cut an associated opportunity in scrap material of the work piece between the first and second parts, the diversion and the associated opportunity being outside of a boundary of the first part defined by the first contour lines, the first part being contained entirely within the boundary of the first part in the work piece;
   means for causing the cutting tool to cut the work piece from the associated opportunity to second contour lines; and
   means for causing the cutting tool to cut the work piece into the second part along the second contour lines, the diversion and the associated opportunity being between the boundary of the first part and a boundary of the second part in the work piece, and forming at least a portion of a direct connection between the first and second contour lines.

2. The machine of claim 1, further comprising means for creating the diversion contour lines without human assistance.

3. The machine of claim 1, wherein the diversion contour lines are machine generated.

4. The machine of claim 3, wherein the first contour lines, the second contour lines, and the diversion contour lines are arranged to minimize the amount of work piece cut between the first and second contour lines.

5. The machine of claim 1, wherein the diversion contour lines and the second contour lines overlap.

6. The machine of claim 1, wherein the opportunity is spaced apart from the second contour lines.

7. The machine of claim 1, wherein the cutting tool moves along the first contour lines at a uniform speed and along the second contour lines at a second uniform speed.

8. An apparatus for cutting a work piece, comprising:
a cutting tool;
a numerical control unit for guiding the cutting tool;
a computer programmed to arrange first part contour lines corresponding to a first part, second part contour lines corresponding to a second part, and first diversion contour lines corresponding to a first diversion on the work piece, the first diversion contour lines being outside of a boundary of the first part defined by the first contour lines, the first part being contained entirely within the boundary of the first part in the work piece; and
programming in data communication with the numerical control unit that causes the numerical control unit to guide the cutting tool, while the cutting tool is activated to cut the work piece, over:
(a) a first portion of the first part contour lines;
(b) the first diversion contour lines to create a first opportunity;
(c) a second portion of the first part contour lines to create the first part;
(d) the work piece between the first opportunity and the second part contour lines; and
(e) the second part contour lines to create the second part,
wherein the first diversion contour lines and the first opportunity form at least a portion of a direct connection between the first part contour lines and the second part contour lines in scrap material of the work piece, and
whereby the first and second parts are cut from the work piece with no more than one pierce point.

9. The apparatus of claim 8, wherein the first part contour lines, the second part contour lines, and the first diversion contour lines are arranged to minimize a first amount of the work piece consumed by the first and second parts and minimize a second amount of work piece cut between the first diversion contour lines and the second part contour lines.

10. The apparatus of claim 8, wherein the computer is separate from the numerical control unit.

11. The apparatus of claim 8, wherein the computer is programmed to arrange third part contour lines corresponding to a third part and second diversion contour lines corresponding to a second diversion on the work piece, the apparatus further comprising:
programming in data communication with the numerical control unit that causes the numerical control unit to guide the cutting tool, while the cutting tool is activated, over:
(a) the second diversion contour lines to create a second opportunity;
(b) the work piece between the second opportunity and the third part contour lines; and
(c) the third part contour lines to create the third part;
wherein the second diversion contour lines extend from the first part contour lines or the second part contour lines, the second diversion contour lines forming at least a portion of a direct connection between the third part contour lines and one of the first part contour lines and the second part contour lines in the scrap material of the work piece,
whereby the first, second, and third parts are cut from the work piece with no more than one pierce point.

12. The apparatus of claim 11, wherein the programming in data communication with the numerical control unit causes the cutting tool to move along the first part contour lines at a first uniform speed and along the second part contour lines at a second uniform speed.

13. The apparatus of claim 11, wherein the first opportunity is spaced apart from the second part contour lines.

14. The apparatus of claim 11, wherein the second diversion contour lines extend from the first part contour lines.

15. The apparatus of claim 11, wherein the second diversion contour lines extend from the second part contour lines.

16. The apparatus of claim 8, wherein the first diversion contour lines and the second part contour lines overlap.

17. The apparatus of claim 8, wherein the first opportunity is spaced apart from the second part contour lines.

* * * * *